(12) United States Patent
Wang et al.

(10) Patent No.: US 11,746,948 B2
(45) Date of Patent: Sep. 5, 2023

(54) ADJUSTMENT DEVICE, ADJUSTMENT ASSEMBLY AND ADJUSTMENT METHOD FOR SPLICING DISPLAY SCREEN

(71) Applicant: BOE TECHNOLOGY GROUP CO., LTD., Beijing (CN)

(72) Inventors: Zifeng Wang, Beijing (CN); Yan Ren, Beijing (CN); Lei Cao, Beijing (CN); Junmin Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 705 days.

(21) Appl. No.: 16/923,316

(22) Filed: Jul. 8, 2020

(65) Prior Publication Data

US 2021/0010631 A1      Jan. 14, 2021

(30) Foreign Application Priority Data

Jul. 12, 2019    (CN) .......................... 201910630520.3

(51) Int. Cl.
| | |
|---|---|
| *F16M 11/04* | (2006.01) |
| *G09F 9/302* | (2006.01) |
| *G01G 5/06* | (2006.01) |
| *G01G 5/00* | (2006.01) |

(52) U.S. Cl.
CPC ........... *F16M 11/043* (2013.01); *G01G 5/006* (2013.01); *G01G 5/06* (2013.01); *G09F 9/3026* (2013.01)

(58) Field of Classification Search
CPC ...... F16M 11/043; F16M 11/18; G01G 5/006; G01G 5/06; G09F 9/3026; F15B 21/02
See application file for complete search history.

(56) References Cited

U.S. PATENT DOCUMENTS

2007/0221054 A1*   9/2007   Webster ................ F15B 15/225
                                                       91/394
2011/0279352 A1*  11/2011   Adema ..................... G09F 9/30
                                                       345/1.3
(Continued)

FOREIGN PATENT DOCUMENTS

| CN | 103531104 A | * | 1/2016 | |
| CN | 109215514 A | * | 1/2019 | |
| CN | 109538896 A | * | 3/2019 | ........... F16M 11/043 |

(Continued)

*Primary Examiner* — Terrell L McKinnon
*Assistant Examiner* — Ding Y Tan
(74) *Attorney, Agent, or Firm* — WHDA, LLP (57) ABSTRACT

An adjustment device for a splicing display screen includes: a housing including housing walls and an accommodating cavity, the housing walls including first, second, third and fourth housing walls; a piston member including a piston and a piston rod, wherein the piston is slidably connected in the accommodating cavity, a through hole is provided in the fourth housing wall, and the piston rod is slidably connected in the through hole; an elastic pressing portion in the first housing wall, serving as a part of the first housing wall; and a hydraulic sensor in the accommodating cavity. The accommodating cavity is filled with hydraulic fluid, an inner surface of the elastic pressing portion contacts the hydraulic fluid, and the piston member is configured to be driven by the hydraulic fluid to move in an extending direction of the through hole in response to a pressure applied on the elastic pressing portion.

18 Claims, 7 Drawing Sheets

(56) References Cited

U.S. PATENT DOCUMENTS

2012/0135831 A1\* 5/2012 Perissinotto .......... F16H 7/0836
  474/110
2019/0277377 A1\* 9/2019 Heo ........................ F16H 19/02

FOREIGN PATENT DOCUMENTS

| KR | 20190009235 A | \* | 1/2019 |
| KR | 20190061745 A | \* | 6/2019 |
| WO | WO-2016101584 A1 | \* | 6/2016 |

\* cited by examiner

ADJUSTMENT DEVICE, ADJUSTMENT ASSEMBLY AND ADJUSTMENT METHOD FOR SPLICING DISPLAY SCREEN

CROSS-REFERENCE TO RELATED APPLICATION

This application claims the benefit of Chinese Patent Application No. 201910630520.3 filed on Jul. 12, 2019 in the State Intellectual Property Office of China, the whole disclosure of which is incorporated herein by reference.

TECHNICAL FIELD

The present disclosure relates to the field of display technology, in particular to an adjustment device, an adjustment assembly and an adjustment method for a splicing display screen.

BACKGROUND

At present, in order to meet the needs of advertising or super-large display, splicing display screens are more and more widely used, such as a liquid crystal splicing display screen (LCD splicing display screen) or a light emitting diode splicing display (LED splicing display screen) formed by splicing multiple display panels in a matrix arrangement.

SUMMARY

In one aspect, an adjustment device for a splicing display screen is provided, comprising: a housing, the housing comprising a plurality of housing walls and an accommodating cavity surrounded by the plurality of housing walls, the plurality of housing walls comprising at least a first housing wall, a second housing wall, a third housing wall and a fourth housing wall, a piston member comprising a piston and a piston rod, wherein the piston is slidably connected in the accommodating cavity, a through hole is provided in the fourth housing wall, and the piston rod is slidably connected in the through hole; an elastic pressing portion in the first housing wall, the elastic pressing portion serving as a part of the first housing wall; and a hydraulic sensor in the accommodating cavity and on an inner surface of the second housing wall facing the accommodating cavity, wherein the accommodating cavity is filled with hydraulic fluid, an inner surface of the elastic pressing portion facing the accommodating cavity contacts the hydraulic fluid, and the piston member is configured to be driven by the hydraulic fluid to move in an extending direction of the through hole in response to a pressure applied on the elastic pressing portion.

According to some exemplary embodiments of the present disclosure, the adjustment device for the splicing display screen further comprises an indicator, wherein the indicator is provided on the third housing wall and is in a communication connection with the hydraulic sensor.

According to some exemplary embodiments of the present disclosure, the first housing wall and the second housing wall are oppositely arranged, and an orthographic projection of the elastic pressing portion on the first housing wall at least partially overlaps an orthographic projection of the hydraulic sensor on the first housing wall.

According to some exemplary embodiments of the present disclosure, each of the third housing wall and the fourth housing wall connects the first housing wall with the second housing wall, and the third housing wall and the fourth housing wall are arranged adjacent to each other.

According to some exemplary embodiments of the present disclosure, the adjustment device for the splicing display screen further comprises a hydraulic restoring structure for adjusting a pressure of the hydraulic fluid in the accommodating cavity, wherein the hydraulic restoring structure comprises a communication cavity and a restoring bolt, the communication cavity is provided at a bottom of the housing and communicates with the accommodating cavity, the communication cavity comprises an opening in the third housing wall, and the restoring bolt extends into the communication cavity through the opening.

In another aspect, an adjustment assembly for a splicing display screen is provided, comprising the adjustment device as described above.

According to some exemplary embodiments of the present disclosure, the adjustment device for the splicing display screen further comprises a connection assembly, wherein the connection assembly and two splicing display units jointly define an accommodating channel, and the adjustment device is disposed in the accommodating channel.

According to some exemplary embodiments of the present disclosure, the connection assembly comprises a connection piece and a plurality of first fastening elements, and the connection piece is connected to the two splicing display units through the plurality of first fastening elements.

According to some exemplary embodiments of the present disclosure, the splicing display unit has a supporting portion, the supporting portion is located in the accommodating channel; and the housing of the adjustment device is sandwiched between the supporting portion and the connection piece.

According to some exemplary embodiments of the present disclosure, the adjustment device for the splicing display screen further comprises an adjustment bolt, wherein an orthographic projection of the adjustment bolt on the first housing wall at least partially overlaps the elastic pressing portion, so that an end of the adjustment bolt facing the accommodating channel is capable of pressing against the elastic pressing portion.

According to some exemplary embodiments of the present disclosure, the second housing wall of the housing contacts two splicing display units, and an outer surface of the second housing wall away from the accommodating cavity is a flat surface.

According to some exemplary embodiments of the present disclosure, the connection assembly further comprises a magnetic element, a rigid flat piece, and a second fastening element, the magnetic element is disposed between the connection piece and the rigid flat piece, and the second fastening element fixedly connects the connection piece, the magnetic element, and the rigid flat piece together.

According to some exemplary embodiments of the present disclosure, the adjustment device for the splicing display screen further comprises an indicator, wherein the indicator is provided on the third housing wall and is in a communication connection with the hydraulic sensor.

According to some exemplary embodiments of the present disclosure, the first housing wall and the second housing wall are oppositely arranged, and an orthographic projection of the elastic pressing portion on the first housing wall at least partially overlaps an orthographic projection of the hydraulic sensor on the first housing wall.

According to some exemplary embodiments of the present disclosure, each of the third housing wall and the fourth housing wall connects the first housing wall with the second housing wall, and the third housing wall and the fourth housing wall are arranged adjacent to each other.

According to some exemplary embodiments of the present disclosure, the adjustment device further comprises a hydraulic restoring structure for adjusting a pressure of the hydraulic fluid in the accommodating cavity; the hydraulic restoring structure comprises a communication cavity and a restoring bolt, the communication cavity is provided at a bottom of the housing and communicates with the accommodating cavity, the communication cavity comprises an opening in the third housing wall, and the restoring bolt extends into the communication cavity through the opening.

In another further aspect, an adjustment method for a splicing display screen is provided, comprising:

setting a preset pressure according to a weight of a splicing display unit;

initially connecting two splicing display units by using a connection assembly, the connection assembly and the two display units jointly defining an accommodating channel;

providing the adjustment device according to claim 1 in the accommodating channel;

rotating an adjustment bolt so that an end of the adjustment bolt facing the accommodating channel presses against the elastic pressing portion, so that the elastic pressing portion compresses a volume of the accommodating cavity;

under an action of the hydraulic fluid in the accommodating cavity, causing a relative displacement between the two splicing display units by the piston member, to adjust a spacing between the two splicing display units; and stopping rotating the adjustment bolt in response to the hydraulic sensor detecting that a pressure of the hydraulic fluid reaches the preset pressure.

According to some exemplary embodiments of the present disclosure, the adjustment device further comprises an indicator, the indicator is provided on the third housing wall and is in a communication connection with the hydraulic sensor; the step of stopping rotating the adjustment bolt in response to the hydraulic sensor detecting that a pressure of the hydraulic fluid reaches the preset pressure comprises: in response to the hydraulic sensor detecting that the pressure of the hydraulic fluid reaches the preset pressure, sending a signal from the hydraulic sensor to the indicator, and sending an indication signal by the indicator; and stopping rotating the adjustment bolt in response to the indication signal.

DETAILED DESCRIPTION OF EMBODIMENTS

In order to make objectives, technical solutions, and advantages of the embodiments of the present disclosure more cleat the technical solutions of the embodiments of the present disclosure will be described clearly and completely in conjunction with the drawings of the embodiments of the present disclosure. Obviously, the described embodiments are a part of the embodiments of the present disclosure, but not all the embodiments. The embodiments of the present disclosure and the features in the embodiments may be combined with each other without conflict to obtain other embodiments. Based on the described embodiments of the present disclosure, all other embodiments obtained by those skilled in the art without creative work fall within the protection scope of the present disclosure.

For ease of description, spatial relationship terms such as "upper", "lower", "left" "right", etc. may be used here to describe the relationship, in the drawings, between one element or feature and another element or feature. It should be understood that the spatial relationship terminology is intended to cover different orientations of the device in use or operation in addition to the orientation described in the drawings. For example, if the device in the drawings is turned over, elements described as "below" or "beneath" other elements or features would then be oriented "above" or "on" the other elements or features.

When an element is described as "on" another element "connected to" another element, or "coupled to" another element, the element may be directly on the another element, directly connected to the another element or directly coupled to the another element, or an intermediate element may be present. However, when an element is described as being "directly on" another element, "directly connected to" another element, or "directly coupled to" another element, there is no intermediate element. Other terms and/or expressions used to describe the relationships between elements should be interpreted in a similar manner, for example, "between" versus "directly between", "adjacent" versus "directly adjacent" or "above" versus "directly above" and the like. In addition, the term "connection" may refer to a physical connection, an electrical connection, a communication connection, and/or a fluid connection. In addition, the X axis, the Y axis, and the Z axis are not limited to three axes of the rectangular coordinate system, and may be interpreted in a broader meaning. For example, the X axis, Y axis, and Z axis may be perpendicular to each other, or may represent different directions that are not perpendicular to each other.

Figure 1:
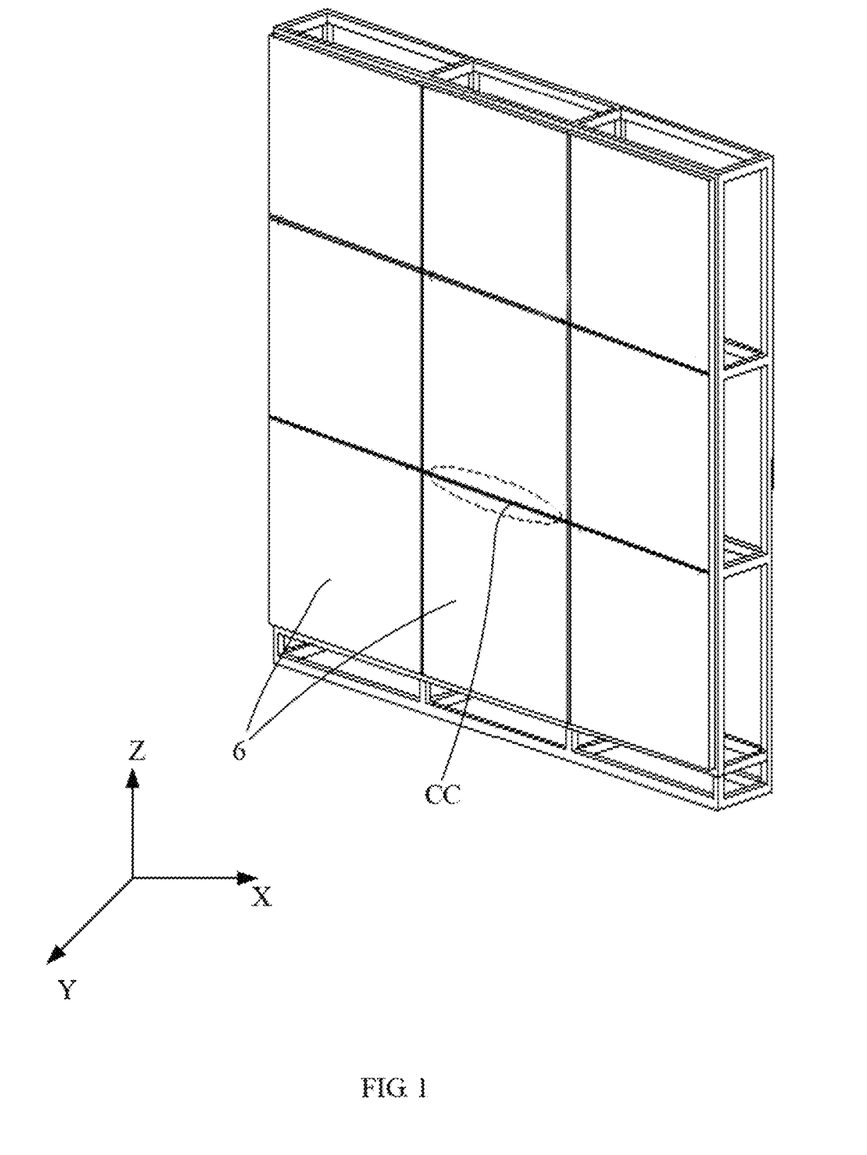
FIG. 1 is a schematic perspective view of a splicing display screen according to some embodiments of the present disclosure.
Figure 2:
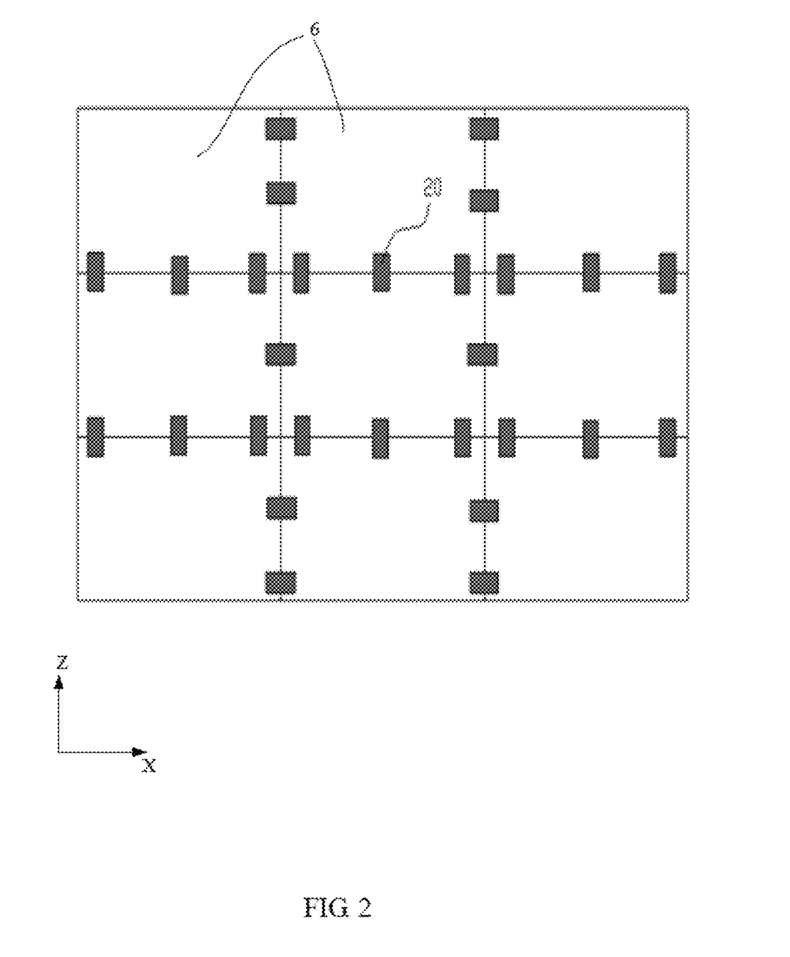
FIG. 2 is a rear view of a splicing display screen according to some embodiments of the present disclosure, which schematically shows a back of the splicing display screen.

FIG. 1 is a schematic perspective view of a splicing display screen according to some embodiments of the present disclosure, and FIG. 2 is a rear view of a splicing display screen according to some embodiments of the present disclosure, which schematically shows the back of the splicing display screen. With reference to FIG. 1 and FIG. 2, the splicing display screen may include a plurality of display units 6 and a plurality of connection assemblies 20 for connecting the plurality of display units. For example, the display unit 6 may be various known display screens, including but not limited to, a liquid crystal display screen, an LED display screen, and the like. The size of a single display unit 6 may include sizes of various commercially available display screens, for example, the display unit 6 may be various commercially available medium-size and large-size display screens. The plurality of display units 6 are spliced together by using a plurality of connection assemblies 20, thereby forming an oversized display screen. In the embodiments of FIG. 1 and FIG. 2, nine display units 6 are shown as being spliced together. However, the embodiments of the present disclosure are not limited to this, and less or more display units 6 may be spliced together to form the splicing display screen.

In this context, since a plurality of display units are spliced to form a large-sized display screen, each display unit may also be referred to as a splicing display unit.

Referring to FIG. 2, a plurality of connecting assemblies 20 may be provided between two adjacent display units 6 to firmly connect the display units 6 together. For example, the plurality of connection assemblies 20 may be disposed at peripheral positions and corner positions of the display unit 6, and the plurality of connection assemblies 20 may be evenly arranged in a peripheral direction of the display unit 6 to provide the display unit 6 with an average supporting force. After the connection assemblies 20 connect the plurality of display units 6 together, the splicing display screen is also fixed on a supporting body (such as a wall body) by using the connection assemblies 20.

The plurality of connection assemblies 20 are all located on the backs of the display units 6. On the front of each display unit 6, display screens of the display units 6 are spliced together to form a large-area display screen. As shown in FIG. 1, a dotted-line frame CC schematically shows a splicing position of two adjacent display units 6. It should be understood that a distance or spacing (hereinafter, the distance or spacing is referred to as a splicing gap) between two adjacent display units 6 at the splicing position CC needs to meet design requirements. With the continuous improvement of the display effect of the splicing display screen, the splicing gap needs to be reduced to reduce the gaps between the respective display units. At the same time, if the splicing gap is too small, two adjacent display units 6 will squeeze each other in particular, in the height direction (Z direction in the figure). In the stacked splicing display screen, an upper display unit will squeeze a lower display unit. This squeeze will cause the display image of the display unit at the splicing position CC to be abnormal, thereby affecting the display effect.

Figure 3:
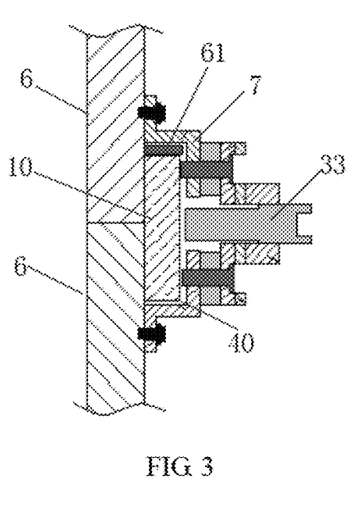
FIG. 3 is a schematic structural view of an adjustment assembly for a splicing display screen according to some embodiments of the present disclosure, wherein the adjustment assembly for the splicing display screen is in an assembled state.
Figure 4:
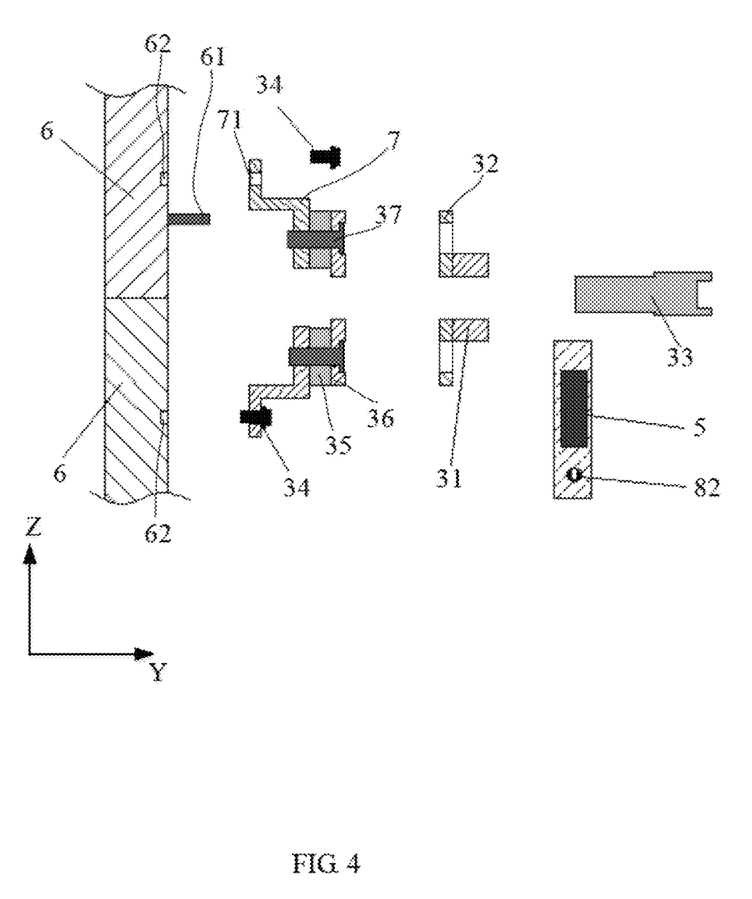
FIG. 4 is a schematic structural view of an adjustment assembly for a splicing display screen according to some embodiments of the present disclosure, wherein the adjustment assembly for the splicing display screen is in a disassembled state.
Figure 5:
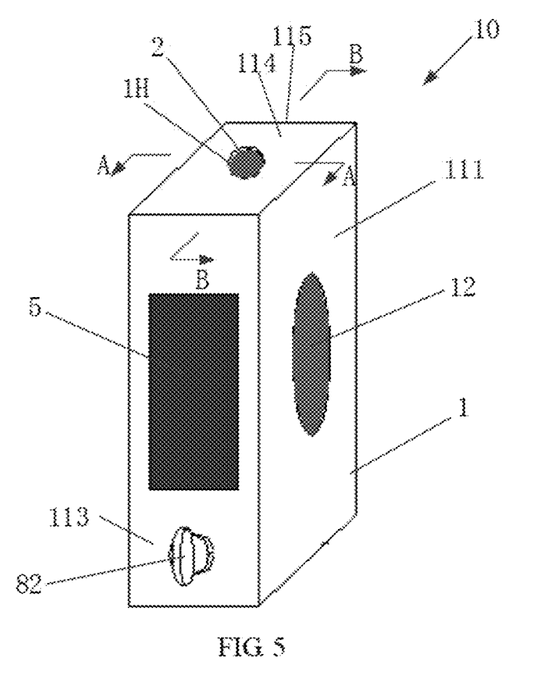
FIG. 5 is a schematic structural view of an adjustment device for a splicing display screen according to some embodiments of the present disclosure.
Figure 6:
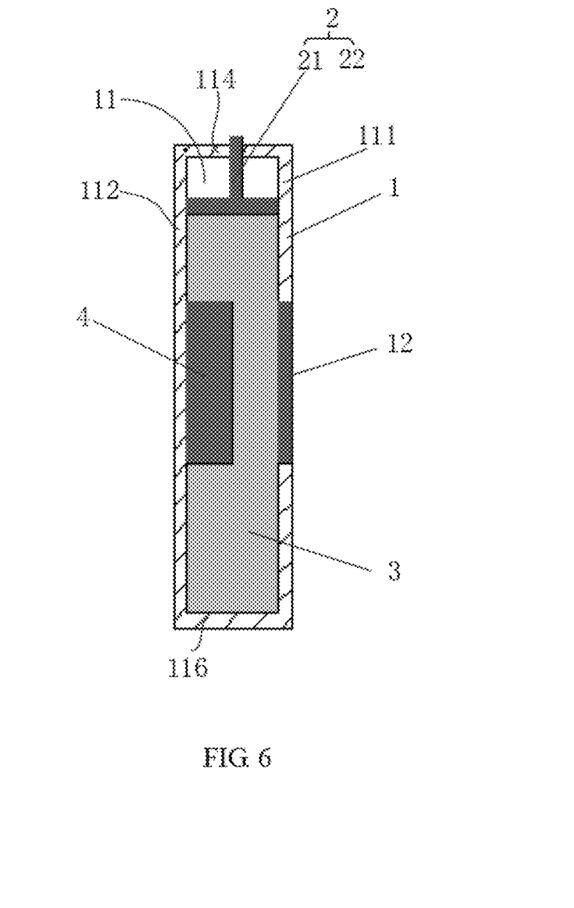
FIG. 6 is a schematic cross-sectional view taken along line A-A in FIG. 5.
Figure 7:
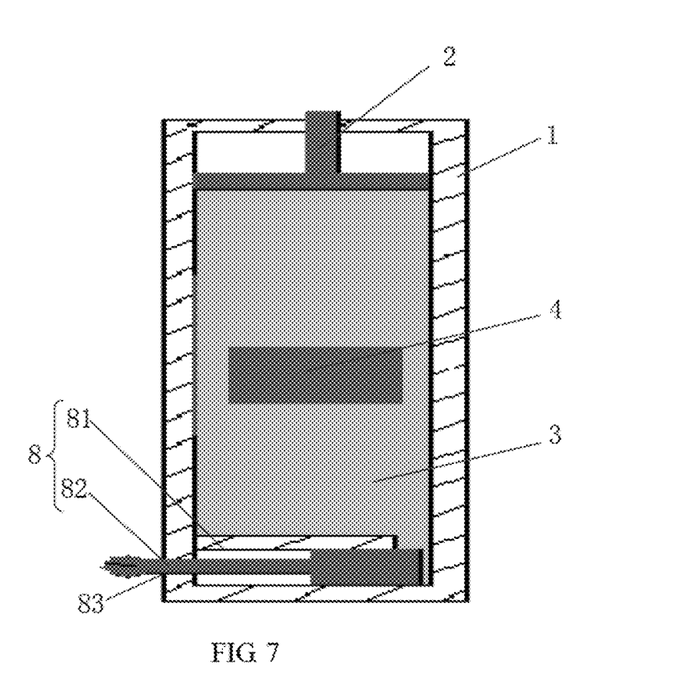
FIG. 7 is a schematic cross-sectional view taken along line B-B in FIG. 5.

FIG. 3 is a schematic structural view of an adjustment assembly for a splicing display screen according to some embodiments of the present disclosure, wherein the adjustment assembly for the splicing display screen is in an assembled state. FIG. 4 is a schematic structural view of an adjustment assembly for a splicing display screen according to some embodiments of the present disclosure, wherein the adjustment assembly for the splicing display screen is in a disassembled state. FIG. 5 is a schematic structural view of an adjustment device for a splicing display screen according to some embodiments of the present disclosure. FIG. 6 is a schematic cross-sectional view taken along line A-A in FIG. 5. FIG. 7 is a schematic cross-sectional view taken along line B-B in FIG. 5.

With reference to FIG. 2 to FIG. 4, the adjustment assembly for the splicing display screen according to some embodiments of the present disclosure may include an adjustment device 10 for a splicing display screen and a connection assembly 20. The adjustment assembly may splice a plurality of display units 6, and may adjust the slicing gap between adjacent display units 6, so that the splicing gap meets the design requirements.

As shown in FIG. 1 and FIG. 2, the splicing display screen is formed by splicing a plurality of display units 6 arranged in an array. With reference to FIG. 3 and FIG. 4, a supporting portion 61 is provided on the back side of the display unit 6 near the bottom edge. The connection assembly 20 connects two adjacent display units 6, and an accommodating channel 40 is formed between the connection assembly 20 and the splicing display units 6. The supporting portion 61 is located in the accommodating channel 40. The adjustment device 10 for a splicing display screen is provided in the accommodating channel 40 and may adjust the splicing gap between the display units 6.

As shown in FIGS. 5-7, the adjustment device 10 for a splicing display screen may include: a housing 1, a piston member 2, an elastic pressing portion 12, a hydraulic sensor 4, and an indicator 5.

For example, the housing 1 may have a hollow cuboid shape. Specifically, the housing 1 may have six housing walls 111, 112, 113, 114, 115, and 116. As shown in FIGS. 5 and 6, the housing wall 111 and the housing wall 112 are oppositely arranged. The housing wall 111 is a wall of the housing 1 on the right side, and the housing wall 112 is a wall of the housing 1 on the left side. The housing wall 113 and the housing wall 115 are oppositely arranged, the housing wall 113 is a wall of the housing 1 on the front side, the housing wall 115 is the wall of the housing 1 on the rear side; the housing wall 114 and the housing wall 116 are oppositely arranged, the housing wall 114 is a wall of the housing 1 on the upper side, and the housing wall 116 is the wall of the housing 1 on the lower side. The six housing walls 111, 112, 113, 114, 115, and 116 surround an accommodating cavity 11 of the housing 1, that is, the accommodating cavity 11 is a sealed accommodating cavity.

The housing 1 may be provided with a suitable volume and a suitable shape according to the needs of use, as long as it may be placed in the connection assembly 20 for connecting the two display units 6. For example, the housing 1 may be made of a metal material, such as aluminum alloy or steel.

It should be noted that, in this context, an expression "wall" or "housing wall" refers to a side wall of the housing having a certain thickness. Each "wall" or "housing wall" may have an inner surface facing the accommodating cavity of the housing and an outer surface facing away from the accommodating cavity of the housing.

The accommodating cavity 11 is also filled with hydraulic fluid 3 which may force the piston member 2 to move toward or away from the housing wall 114.

The piston member 2 includes a piston rod 21 and a piston 22. The piston 22 is accommodated in the accommodating cavity 11 and slidably fits in the accommodating cavity 11. Specifically, one side of the piston 22 contacts the inner surface of the housing wall 111 and the other side of the piston 22 contacts the inner surface of the housing wall 112. At least a part of the piston rod 21 is accommodated in the accommodating cavity 11. Specifically, a through hole 1H is provided in the housing wall 114, one end of the piston rod 21 is connected to the piston 22, and the other end of the piston rod 21 passes through the through hole 1H and slidably fits with the through hole 1H. For example, the outer diameter of the piston rod 21 is substantially equal to the inner diameter of the through hole 1H. In this way the piston member 2 may be slidably fitted into the accommodating cavity 11, and one end thereof is slidably fitted into the through hole 1H.

For example, an orthographic projection of the piston rod 21 on the housing wall 114 falls within an orthographic projection of the piston 22 on the housing wall 114, and an area of the orthographic projection of the piston rod 21 on the housing wall 114 is smaller than an area of the orthographic projection of the piston 22 on the housing wall 114. For example, the area of the orthographic projection of the piston rod 21 on the housing wall 114 is ⅕ to ​1⁄20​ of the area of the orthographic projection of the piston 22 on the housing wall 114.

In this way, it is possible to apply a pressure on the piston 22 through the hydraulic fluid 3 in the accommodating cavity 11, and then to push the piston rod 21 to protrude through the through hole 1H by the piston 22, so as to convert the fluid pressure into a supporting force.

For example, the piston member 2 may be made of a metal material, for example, the same material as the housing 1, and made of aluminum alloy or steel.

The elastic pressing portion 12 is provided in one housing wall of the housing 1 and serves as a part of the housing wall. As shown, the elastic pressing portion 12 may be provided in the housing wall 111 and serve as a part of the housing wall 111. For example, the elastic pressing portion 12 may be formed of an elastic material and provided in the housing wall 111 of the housing 1 through a hot-melt bonding manner, that is, an area of the housing wall 111 of the housing 1 needs to be removed form n a blank area, and then an elastic material layer is bonded to a periphery of the blank area through the hot-melt bonding manner.

Optionally, the elastic pressing portion 12 is provided at a central position of the housing wall 111 of the housing 1.

The hydraulic sensor 4 is disposed in the accommodating cavity 11 and immersed in the hydraulic fluid 3. For example, the hydraulic sensor 4 may be provided on the inner surface of the housing wall 112. The indicator 5 is provided on the housing 1 and is in a communication connection with the hydraulic sensor 4, that is, the hydraulic sensor 4 may transmit a signal such as the pressure of the hydraulic fluid detected by the hydraulic sensor 4 to the indicator 5. The hydraulic sensor 4 may only function to detect a change in pressure of the hydraulic fluid. Optionally, the hydraulic sensor 4 may include a hydraulic sensing module and a processor, for example, the processor may be a micro-processor. The hydraulic pressure sensor 4 may be configured to transmit indication information to the indicator 5 when the detected pressure reaches a preset pressure. For example, the indicator 5 may be an indicator light or an indication screen, which is configured to issue indication information to the user. For example, the processor is connected to the hydraulic sensor module and the indicator 5, respectively. The hydraulic pressure sensing module transmits the detected pressure signal to the processor, and the processor controls the indicator 5 to issue the indication information based on the pressure signal.

Specifically, through the arrangement of the processor, the user can set the required preset pressure according to the splicing display screen to be adjusted and the position to be adjusted, that is, the preset pressure is a pressure to enable the upper splicing display unit 6 to be adjusted to a suitable position. In this way, when the applied pressure reaches the preset pressure, the processor may control the indicator 5 to issue the indication information according to the preset pressure signal to indicate that the user has adjusted in place, thereby achieving a precise adjustment.

As shown in FIG. 6, the housing wall 112 where the hydraulic sensor 4 is located and the housing wall 111 where the elastic pressing portion 12 is located are two opposite housing walls of the housing 1. An orthographic projection of the hydraulic pressure sensor 4 on the housing wall 112 at least partially overlaps an orthographic projection of the elastic pressing portion 12 on the housing wall 112, With this an arrangement, the hydraulic sensor 4 and the elastic pressing portion 12 are oppositely arranged, so that the detection of the hydraulic sensor 4 is more accurate.

As shown in FIGS. 5 and 7, the adjustment device 10 for a splicing display screen according to some embodiments of the present disclosure may further include a hydraulic restoring structure 8, and the hydraulic restoring structure 8 is provided on the housing 1 for adjusting the pressure in the accommodating cavity 11.

Specifically, the hydraulic restoring structure 8 may include a communication cavity 81 and a restoring bolt 82. The communication cavity 81 is provided at the bottom of the housing 1 and communicates with the accommodating cavity 11. The communication cavity 81 is provided with an opening 83 at a position close to the bottom of the housing wall 112 of the housing 1, and the restoring bolt 82 extends into the communication cavity 81 through the opening 83 and is connected with the communication cavity 81 in a screw manner.

Both the communication cavity 81 and the accommodating cavity 11 form a communication device. When the pressure applied on the hydraulic fluid 3 in the accommodating cavity 11 needs to be released, the restoring bolt 82 may be screwed to occupy a smaller space of the communication cavity 81, that is, a part of the communication cavity 81 is vacated, and then a part of the hydraulic fluid 3 in the accommodation cavity 11 may enter the communication cavity 81, in this way, the pressure of the hydraulic fluid is reduced.

As shown in FIGS. 5 and 7, in a specific implementation, the opening 83 of the communication cavity 81 and the indicator 5 are located on the same housing wall of the housing 1, for example, both on the housing wall 113; and the housing wall 113 and the housing wall 111 provided with the elastic pressing portion 12 are adjacent housing walls.

Specifically, when the housing 1 is in the shape of a cuboid or a cube, one housing wall 112 of the housing 1 may be attached to the backs of the two display units 6 at the splicing position, and the elastic pressing portion 12 is opposite to the housing wall 112. In this case, the opening 83 of the communication cavity 81 and the indicator 5 are arranged on the housing wall 113 adjacent to the elastic pressing portion 12 to facilitate viewing of the indication information of the indicator 5, and the restoring bolt 82 provided in the opening 83 does not abut against the backs of the display units 6 to avoid interference.

Optionally, the adjustment device 10 for a splicing display screen provided by some embodiments of the present disclosure may further include an input port, the input port is provided on an outer surface of one housing wall of the housing 1 and is in a communication connection to the hydraulic pressure sensor 4. For example, the input port may be set as a USB port. In this way, a preset pressure may be set through the input port, and the preset pressure may be transmitted to the hydraulic sensor 4.

Referring back to FIGS. 3 and 4, the connection assembly 20 may include a connection piece 7, a magnetic element 35, a rigid flat piece 36, a supporting bar 31, an adapter piece 32, a first fastening element 34 and a second fastening element 37.

The connection piece 7 may have a flange structure. As shown in FIG. 4, the connection piece 7 is provided with a plurality of through holes 71. Correspondingly, blind holes 62 are provided on the backs of two adjacent display units 6 in the Z direction. The first fastening element 34 such as a fastening screw may pass through the through hole 71 and be screwed into the blind hole 62 to fix the connection piece 7 to the two display units 6.

The magnetic element 35 is arranged between the connection piece 7 and the rigid flat piece 36, and the second fastening element 37 may fix the connection piece 7, the magnetic element 35 and the rigid flat piece 36 together, so that the magnetic element 35 is sandwiched between the connection piece 7 and the rigid flat piece 36. By providing the magnetic element and the rigid flat piece, in the process of splicing two splicing display units by using the connection piece 7, the splicing display unit may be roughly positioned by using the connection assembly, which is beneficial to improve the splicing quality.

One end of the supporting bar 31 is connected to the adapter piece 32, and the other end may be connected to a supporting frame or wall, wherein the supporting frame or wall is a supporting frame or wall for installing the splicing display screen. The supporting bar 31 may be connected to the connection piece 7 through the adapter piece 32.

As shown in FIGS. 3 and 4, the adjustment assembly for the splicing display screen nay further include an adjustment bolt 33. When the connection assembly 20 is connected to two adjacent display units 6, an accommodating channel 40 is formed between the connection assembly 20 and the splicing display units 6. The adjustment bolt 33 may extend into the accommodating channel 40 to contact the adjustment device 10 located in the accommodating channel 40.

Alternatively, the supporting portion 61 may be attached to an upper inner surface (the surface facing the accommodating channel 40) of the connection piece 7, and the housing wall 114 of the housing 1 of the adjusting device 10 for a splicing display screen is in contact with the supporting portion 61, that is, in the Z direction, the supporting portion 61 is sandwiched between the housing wall 114 of the housing 1 and the inner surface of the connection piece 7. The housing wall 116 of the housing 1 is in contact with the lower inner surface of the connection piece 7. That is, in the Z direction, the housing 1 is sandwiched between the supporting portion 61 and the connection piece 7.

The adjustment bolt 33 may contact the elastic pressing portion 12 of the adjustment device 10. Specifically, when the adjustment bolt 33 is rotated, an end surface of the adjustment bolt 33 close to the adjustment device 10 may press against the elastic pressing portion 12. When a preset pressure is applied to the elastic pressing portion 12, the piston member 2 may lift the display unit 6 by a preset distance, and the indicator 5 issues the indication information.

Some exemplary embodiments of the present disclosure also provide an adjustment method for a splicing display screen. The adjustment method will be described in detail below in conjunction with the foregoing FIGS. 1 to 7.

In step S11, a preset pressure is set in advance according to the weight of the display unit 6 to be adjusted.

Optionally, the preset pressure may be input to the hydraulic sensor 4 through the input port.

In step S12, the first fastening element 34 connecting the connection piece 7 and the display unit 6 located above is loosened, and the adjustment device 10 for a splicing display screen is placed into the accommodating channel 40. The adjustment device 10 for a splicing display screen is sandwiched between the supporting portion 61 and the connection piece 7 in the Z direction.

In step S13, the adjustment bolt 33 is rotated so that the end surface of the adjustment bolt 33 close to the adjustment device 10 presses against the elastic pressing portion 12 of the adjustment device 10. In this step, the adjustment bolt 33 applies a pressure to the elastic pressing portion 12, and the elastic pressing portion 12 deforms toward the accommodating cavity 11 under the action of pressure, so that the volume of the accommodating cavity 11 is reduced. The pressure of the hydraulic fluid 3 accommodated in the accommodating cavity 11 increases, thereby applying an upward supporting force on the piston member 2. As the adjustment bolt 33 rotates, the amount of deformation generated by the elastic pressing portion 12 increases, and accordingly, the pressure of the hydraulic fluid 3 increases, and the supporting force applied to the piston member 2 also increases. Under the action of the supporting force, the piston member 2 may move upward, so that the supporting portion 61 and the upper display unit 6 also move upward. In this way, the spacing between the two display units 6 is adjusted.

In step S14, the hydraulic sensor 4 detects that the pressure of the hydraulic 3 reaches the preset pressure, and transmits a signal to the indicator 5, so that the indicator 5 sends out an indication signal.

For example, the indicator 5 may include an indication screen. When the signal from the hydraulic sensor 4 is received, the indication screen displays the indication information, for example, displays a specific color, a specific pattern, or directly displays a pressure value, or the like. Optionally, the indicator 5 may include an indicator light, and when the signal from the hydraulic sensor 4 is received, the indicator light emits light of a preset color as indication information, for example, red light or green light.

In this step, when the indicator 5 issues the indication signal, the rotation of the adjustment bolt 33 may be stopped. At this time, the two display units 6 are positioned at an appropriate spacing.

In step S15, the first fastening element 34 connecting the connection piece 7 and the display unit 6 located above is tightened, the pressure on the adjustment device 10 is removed, and the adjustment device 10 is taken out.

Optionally, the adjustment device 10 for a splicing display device may be set to the next splicing position, and the above adjustment process may be repeated.

In the embodiments of the present disclosure, the adjustment device 10 for a splicing display screen may cooperate with the connection piece 7 connecting the two splicing display units 6 to adjust the spacing between the two splicing display units 6 that are vertically spliced. By applying the pressure to the elastic pressing portion 12, when the applied pressure reaches the preset pressure, that is, when the supporting force of the piston member 2 converted from the pressure may lift the splicing display unit 6 located above by a suitable distance, the indicator 5 may issue an indication information to indicate that the applied pressure has met the requirement for adjusting the appropriate distance between the two splicing display units 6. Therefore, the user may adjust the distance between the two splicing display units 6 that are vertically spliced by using the adjustment device 10 for the splicing display screen. In addition, the preset value of the applied pressure may be set to the hydraulic sensor 4. In this way, when the applied pressure reaches the preset pressure, the indicator 5 will issue the indication information to conveniently and accurately adjust the spacing between the two display units 6 which are vertically spliced.

In the embodiments of the present disclosure, the housing 1 of the adjustment device 10 for a splicing display screen has a cuboid shape or a cube shape, that is, the outer surface of each housing wall of the housing 1 is substantially flat. As shown in FIG. 6, the outer surface of the housing wall 112 of the housing 1 facing the display unit 6 is flat. In this way, when the adjustment device 10 for the splicing display screen is used to adjust the spacing between the two splicing display units 6, the outer surface of the housing wall 112 of the housing 1 may be attached to the backs of the two display units 6 at the splicing position. During the above adjustment process, the pressure is applied to the elastic pressing portion 12, and the outer surface of the housing wall 112 is pressed against the portion of the backs of the two display units 6 at the splicing position, so that the adjustment device adjusts the flatness of the two display units 6 at the splicing position.

In addition, the elastic pressing portion 12 is provided in the central position of the housing wall of the housing 1, so that the applied pressure may act on the central portion of the housing 1, so that the pressure is converted into the supporting force on the piston member 2 more effectively and the pressure evenly acts on the housing 1. In this way the flat surface of the housing 1 opposite to the elastic pressing portion 12 may better adjust the flatness of the two display units 6 at the splicing position.

The above descriptions are only exemplary embodiments of the present disclosure and do not limit the present disclosure in any form. Any modifications, equivalent changes and modifications to the above embodiments based on the technical essence of the present disclosure still fall within the scope of the technical solutions of the present disclosure.

What is claimed is:

1. An adjustment device for a splicing display screen, comprising:
    a housing, the housing comprising a plurality of housing walls and an accommodating cavity surrounded by the plurality of housing walls, the plurality of housing walls comprising at least a first housing wall, a second housing wall, a third housing wall and a fourth housing wall,
    a piston member comprising a piston and a piston rod, wherein the piston is slidably connected in the accommodating cavity, a through hole is provided in the fourth housing wall, and the piston rod is slidably connected in the through hole;
    an elastic pressing portion in the first housing wall, the elastic pressing portion serving as a part of the first housing wall; and
    a hydraulic sensor in the accommodating cavity and on an inner surface of the second housing wall facing the accommodating cavity,
    wherein the accommodating cavity is filled with hydraulic fluid, an inner surface of the elastic pressing portion facing the accommodating cavity contacts the hydraulic fluid, and the piston member is configured to be driven by the hydraulic fluid to move in an extending direction of the through hole in response to a pressure applied on the elastic pressing portion.

2. The adjustment device for the splicing display screen according to claim 1, further comprising an indicator,
    wherein the indicator is provided on the third housing wall and is in a communication connection with the hydraulic sensor.

3. The adjustment device for the splicing display screen according to claim 2, wherein the first housing wall and the second housing wall are oppositely arranged, and an orthographic projection of the elastic pressing portion on the first housing wall at least partially overlaps an orthographic projection of the hydraulic sensor on the first housing wall.

4. The adjustment device for the splicing display screen according to claim 3, wherein each of the third housing wall and the fourth housing wall connects the first housing wall with the second housing wall, and the third housing wall and the fourth housing wall are arranged adjacent to each other.

5. The adjustment device for the splicing display screen according to claim 2, further comprising a hydraulic restoring structure for adjusting a pressure of the hydraulic fluid in the accommodating cavity,
    wherein the hydraulic restoring structure comprises a communication cavity and a restoring bolt, the communication cavity is provided at a bottom of the housing and communicates with the accommodating cavity, the communication cavity comprises an opening in the third housing wall, and the restoring bolt extends into the communication cavity through the opening.

6. An adjustment assembly for a splicing display screen, comprising the adjustment device according to claim 1.

7. The adjustment assembly for the splicing display screen according to claim 6, further comprising a connection assembly,
    wherein the connection assembly and two splicing display units jointly define an accommodating channel, and the adjustment device is disposed in the accommodating channel.

8. The adjustment assembly for the splicing display screen according to claim 7, wherein the connection assembly comprises a connection piece and a plurality of first fastening elements, and the connection piece is connected to the two splicing display units through the plurality of first fastening elements.

9. The adjustment assembly for the splicing display screen according to claim 8, wherein the splicing display unit has a supporting portion, the supporting portion is located in the accommodating channel; and the housing of the adjustment device is sandwiched between the supporting portion and the connection piece.

10. The adjustment assembly for the splicing display screen according to claim 9, further comprising an adjustment bolt,
    wherein an orthographic projection of the adjustment bolt on the first housing wall at least partially overlaps the elastic pressing portion, so that an end of the adjustment bolt facing the accommodating channel is capable of pressing against the elastic pressing portion.

11. The adjustment assembly for the splicing display screen according to claim 6, wherein the second housing wall of the housing contacts two splicing display units, and an outer surface of the second housing wall away from the accommodating cavity is a flat surface.

12. The adjustment assembly for the splicing display screen according to claim 8, wherein the connection assembly further comprises a magnetic element, a rigid flat piece, and a second fastening element, the magnetic element is disposed between the connection piece and the rigid flat piece, and the second fastening element fixedly connects the connection piece, the magnetic element, and the rigid flat piece together.

13. The adjustment assembly for the splicing display screen according to claim 6, further comprising an indicator,
    wherein the indicator is provided on the third housing wall and is in a communication connection with the hydraulic sensor.

14. The adjustment assembly for the splicing display screen according to claim 13, wherein the first housing wall and the second housing wall are oppositely arranged, and an orthographic projection of the elastic pressing portion on the first housing wall at least partially overlaps an orthographic projection of the hydraulic sensor on the first housing wall.

15. The adjustment assembly for the splicing display screen according to claim 14, wherein each of the third housing wall and the fourth housing wall connects the first housing wall with the second housing wall, and the third housing wall and the fourth housing wall are arranged adjacent to each other.

16. The adjustment assembly for the splicing display screen according to claim 6, wherein the adjustment device further comprises a hydraulic restoring structure for adjusting a pressure of the hydraulic fluid in the accommodating cavity;

the hydraulic restoring structure comprises a communication cavity and a restoring bolt, the communication cavity is provided at a bottom of the housing and communicates with the accommodating cavity, the communication cavity comprises an opening in the third housing wall, and the restoring bolt extends into the communication cavity through the opening.

17. An adjustment method for a splicing display screen, comprising:

setting a preset pressure according to a weight of a splicing display unit;

initially connecting two splicing display units by using a connection assembly, the connection assembly and the two display units jointly defining an accommodating channel;

providing the adjustment device according to claim 1 in the accommodating channel;

rotating an adjustment bolt so that an end of the adjustment bolt facing the accommodating channel presses against the elastic pressing portion, so that the elastic pressing portion compresses a volume of the accommodating cavity;

under an action of the hydraulic fluid in the accommodating cavity, causing a relative displacement between the two splicing display units by the piston member, to adjust a spacing between the two splicing display units; and stopping rotating the adjustment bolt in response to the hydraulic sensor detecting that a pressure of the hydraulic fluid reaches the preset pressure.

18. The adjustment method for the splicing display screen according to claim 17, wherein the adjustment device further comprises an indicator, the indicator is provided on the third housing wall and is in a communication connection with the hydraulic sensor:

the step of stopping rotating the adjustment bolt in response to the hydraulic sensor detecting that a pressure of the hydraulic fluid reaches the preset pressure comprises:

in response to the hydraulic sensor detecting that the pressure of the hydraulic fluid reaches the preset pressure, sending a signal from the hydraulic sensor to the indicator, and sending an indication signal by the indicator; and stopping rotating the adjustment bolt in response to the indication signal.

* * * * *